C. P. DE LORE.
HAND TRUCK.
APPLICATION FILED MAR. 25, 1916.
1,194,342.
Patented Aug. 8, 1916.
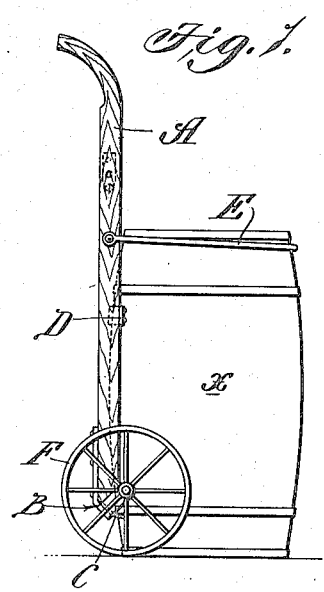
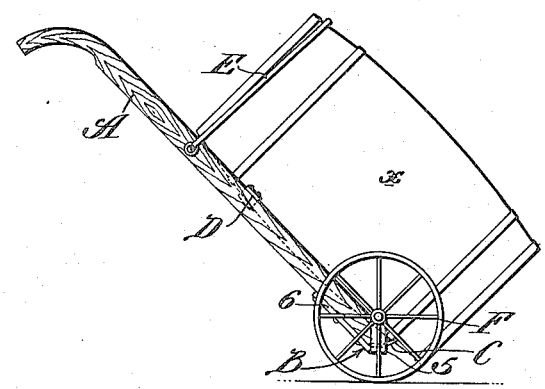
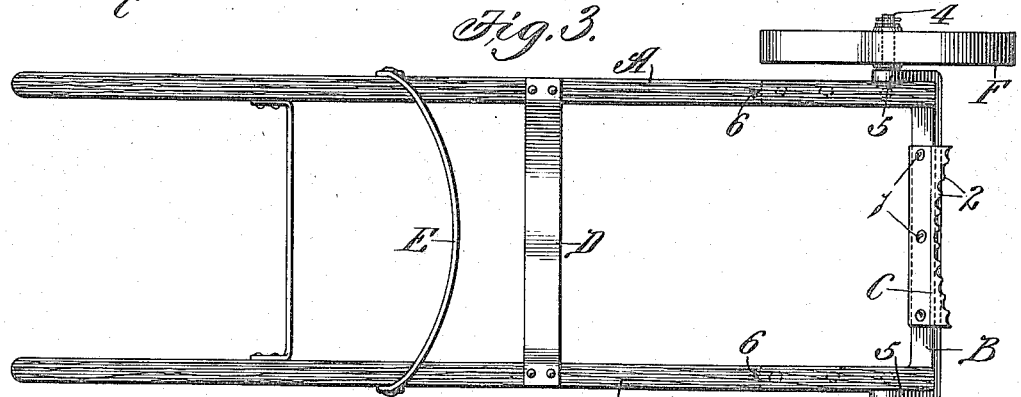
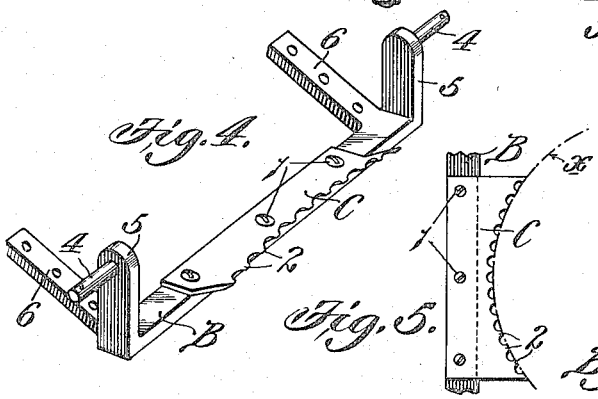
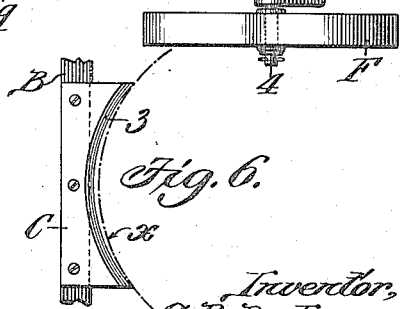
Inventor,
C. P. De Lore.
By Bakewell & Chase Attys.

UNITED STATES PATENT OFFICE.

CASPAR P. DE LORE, OF ST. LOUIS, MISSOURI, ASSIGNOR TO J. C. FINCK MINERAL MILLING CO., OF ST. LOUIS, MISSOURI, A CORPORATION OF MISSOURI.

HAND-TRUCK.

1,194,342.     Specification of Letters Patent.     Patented Aug. 8, 1916.

Application filed March 25, 1916. Serial No. 86,775.

*To all whom it may concern:*

Be it known that I, CASPAR P. DE LORE, a citizen of the United States, residing at St. Louis, Missouri, have invented a certain new and useful Improvement in Hand-Trucks, of which the following is a full, clear, and exact description, such as will enable others skilled in the art to which it appertains to make and use the same.

This invention relates to two-wheeled hand trucks of the kind that are used for conveying barrels, boxes and other objects from one place to another.

The two-wheeled hand trucks that are now in general use are so constructed that in the operation of loading an object onto same the object has to be lifted bodily from the floor or support on which it is standing before the truck can start to tilt into the inclined position in which it is arranged when the truck is being wheeled. This is true of trucks of the type that comprise a blade or portion that is adapted to be slipped under the lower end of the object during the operation of loading the object onto the truck, and it is also true of trucks which are so designed that it is not necessary to tilt the object slightly preparatory to arranging the truck in engagement with the object, namely, trucks of the type that are provided with teeth or sharp projections that bite into the side of the object adjacent the lower end of same. The result is that two-wheeled hand trucks of the type heretofore in general use cannot be used successfully for conveying very heavy objects, such, for example, as barrels weighing seven hundred pounds, owing to the fact that the average workman has not sufficient strength to enable him to bodily lift a barrel weighing seven hundred pounds in a substantially straight upward direction, as is necessary during the operation of tilting the truck into an inclined position, preparatory to wheeling the truck.

The main object of my invention is to provide a two-wheeled hand truck which is so constructed that it can be used successfully by the average workman for conveying very heavy barrels and other objects from one place to another. To this end I have devised a two-wheeled truck in which the wheels are so arranged that one edge of the object being loaded onto the truck will fulcrum on the floor or support on which it rests during the first part of the operation of tilting the truck into an inclined position, preparatory to wheeling the truck, thereby overcoming the necessity of bodily lifting the object in a substantially straight upward direction, as is necessary in the operation of loading an object onto a two-wheeled hand truck of the kind heretofore in general use.

Other objects and desirable features of my invention will be hereinafter pointed out.

Figure 1 of the drawings is a side elevational view, illustrating a hand truck constructed in accordance with my invention, arranged in engagement with a barrel, preparatory to tilting the truck into an inclined position. Fig. 2 is a similar view, illustrating the truck tilted. Fig. 3 is an enlarged top plan view of the truck. Fig. 4 is a perspective view of the cross member at the lower end of the truck frame that carries the wheel spindles and the plate that prevents the barrel from moving longitudinally with relation to the truck frame. Fig. 5 is a top plan view of the plate just referred to; and Fig. 6 is a top plan view of a plate of slightly different form for preventing the object from moving longitudinally with relation to the frame of the truck.

While I have herein illustrated my invention embodied in a hand truck that is particularly adapted for use with barrels, I wish it to be understood that my invention is not limited to a barrel truck, as it is applicable to any type or kind of two-wheeled hand trucks.

Referring to the drawings, which illustrate the preferred form of my invention, A designates the side bars of the frame of the truck, and B designates a cross member at the lower end of the truck frame that is rigidly connected to the side bars A and which preferably carries a means that prevents the object on the truck from moving longitudinally with relation to the frame of the truck. In the truck herein shown said means consists of a plate C on the cross member B that bites into one side of the object on the truck adjacent the lower end of said object, thus overcoming the necessity of tilting the object slightly during the operation of arranging the truck in engagement with same, as shown in Fig. 1. I wish it to be understood, however, that my invention is not limited to a truck provided with a plate or similar device that bites into one side of the object being carried by the truck, for any other suitable means could be employed for preventing longitudinal movement of the object on the truck without departing from the spirit of my invention. The plate C is preferably detachably connected to the cross member B by means of screws or other suitable fastening devices 1, and it is either provided with a curved edge having teeth or serrations 2, as shown in Figs. 4 and 5, or it can be provided with a curved edge 3, as shown in Fig. 6, whose arc is such that the end portions of the plate will bite into the side of the barrel $x$ that is loaded onto the truck. A saddle D is connected to the side bars A so as to form a substantial support for the object carried by the truck and a bail E or other suitable means is provided for retaining said object in operative position and for exerting pressure on the upper end portion of the object during the operation of tilting the truck into an inclined position, preparatory to wheeling the truck.

The truck is provided with two wheels F which are so arranged with relation to the side bars A that the axes of said wheels will be located some distance in front of the side bars when the frame of the truck is arranged in an upright position in engagement with an object that is to be loaded onto the truck, as shown in Fig. 1, thereby causing the wheels F to engage the floor or support on which the object $x$ rests at a point in substantially transverse alinement with the rear edge of said object. When the frame of the truck is tilted rearwardly the rear edge of the barrel or other object being loaded onto the truck will fulcrum on the floor during the first part of the tilting operation, it of course being understood that the bail E is arranged in engagement with the upper portion of the barrel before the frame of the truck is tilted rearwardly. The barrel $x$ continues to fulcrum on the floor until the frame of the truck reaches such a position that the lower edge of the barrel is moved upwardly from engagement with the floor, the barrel being prevented from moving longitudinally with relation to the truck frame by means of the plate C that bites into the side of the barrel adjacent the lower end of same. The barrel is not bodily lifted or raised from the floor until it nearly reaches the inclined position that it occupies when the truck is being wheeled, and in view of the fact that gravity is the force that moves the lower edge of the barrel out of engagement with the floor, very little strength on the part of the operator is required to load the barrel onto the truck. In fact, a truck of the construction above described can be used successfully by the average workman for conveying very heavy barrels weighing as much as seven hundred pounds from one place to another, as it is only necessary for the workman to have sufficient strength to tilt the barrel slightly after the bail E of the truck has been arranged in engagement with the upper end portion of the barrel. After the barrel has started to tilt gravity causes it to continue to move toward a horizontal position, the lower edge of the barrel that fulcrums on the floor during the first part of the tilting operation being moved upwardly from engagement with the floor when the frame of the truck reaches a certain position, owing to the fact that the frame on which the barrel is securely held rotates about an axis located adjacent the lower end of the barrel. When the truck is being wheeled it can be arranged in such a position that the barrel will balance, thus overcoming the necessity of the workman supporting the load carried on the truck.

It is immaterial, so far as my broad idea is concerned, how the wheels F are mounted on the frame of the truck, so long as said wheels are arranged in such a manner that the object being loaded onto the truck will fulcrum on the floor or support on which it stands during the first part of the operation of tilting the truck into an inclined position, and thus overcome the necessity of the workman bodily lifting the object in a substantially upright direction, when he starts to tilt the truck into an inclined position, and it is also immaterial what means is used for exerting pressure on the upper end portion of the barrel and drawing it toward the frame of the truck when the truck is tilted. I prefer, however, to mount the wheels F on spindles 4 that project laterally from arms 5 on the cross member B of the truck frame which are so proportioned and designed that the spindles 4 will be arranged in front of the point where the object engages the frame of the truck and approximately in alinement with the rear edge of said object that fulcrums on the floor when the frame of the truck is tilted rearwardly. In the truck herein shown the arms 5 are arranged at substantially an acute angle with relation to the side bars A of the truck frame, and said arms are integrally connected to the cross member B which is also provided with integral arms 6 to which the side bars A are secured by suitable fastening devices. In addition to the desirable features above mentioned, a hand truck of the construction above described is exceptionally strong and rigid and it can be manufactured at a low cost, on account of the fact that the main cross member of the truck frame and the mounting for the wheels of the truck consists of a single casting that also carries the means which prevents the object on the truck from moving longitudinally with relation to the truck frame.

Having thus described my invention, what I claim, and desire to secure by Letters Patent, is:

1. A two-wheeled hand truck, comprising a frame that is adapted to be arranged in a vertical position against the rear side of an object standing on a floor or support, and wheels on said frame that contact with the support on which the object rests at a point slightly in front of the point where the lower edge of the rear side of said object rests on said support, when said frame is arranged in an upright position against the rear side of said object.

2. A two-wheeled hand truck, comprising a frame that is adapted to be arranged in a vertical position against one side of the object standing on a floor or support, wheels on said frame that contact with the support on which the object rests at a point substantially in alinement with the point where the lower edge of the rear side of said object rests on said support, means for causing the upper end of said object to tilt rearwardly when the frame of the truck is tilted rearwardly, and means for preventing the object from moving longitudinally of the truck after said object has been raised from its support.

3. A two-wheeled hand truck, comprising a frame that is adapted to be arranged in a vertical position against the rear side of an object preparatory to loading said object onto the truck, means on said frame that is adapted to bite into the rear side of said object adjacent the lower edge of same, and wheels on said frame which engage the support on which said object rests at a point in front of the rear side of said object against which said frame bears, thereby causing the object to fulcrum on said support when the upper end portion of the object is tilted rearwardly during the operation of loading it onto the truck.

4. A two-wheeled hand truck, comprising side rails, a cross member connected to said side rails adjacent the lower end of same, arms on said cross member arranged at substantially an acute angle with relation to said side rails so that they will project forwardly beyond the rear side of an object standing in an upright position on a floor or support, and wheels on said arms whose axes lie above the lower rear edge of said object.

5. A two-wheeled hand truck, comprising side rails, a metal cross member provided with integral portions to which the lower end portions of the side rails are connected, arms on said cross member arranged at substantially an acute angle with relation to said side rails so that they will project forwardly beyond the rear side of an upright object when the side rails are arranged in an upright position with the cross member in engagement with the rear side of said object, and wheels on said arms whose axes lie in front of the rear side of said object at a point above the lower rear edge of same.

6. A two-wheeled hand truck, comprising side rails, a metal cross member provided with integral portions to which the lower end portions of the side rails are connected, arms on said cross member arranged at substantially an acute angle with relation to said side rails, wheels on said arms, and means on said cross member that is adapted to bite into the rear side of an object being loaded onto the truck.

7. A two-wheeled hand truck provided with a frame that comprises a metal cross member arranged at the lower end of the frame and equipped with wheels which are so disposed that their axes lie in front of the rear side of an upright object against which the frame of the truck is placed, preparatory to tilting the object rearwardly on its lower rear edge as a fulcrum so as to load it onto the truck.

In testimony whereof I hereunto affix my signature in the presence of two witnesses, this twenty second day of March 1916.

CASPAR P. DE LORE.

Witnesses:
   WELLS L. CHURCH,
   GEORGE BAKEWELL.